United States Patent
Tanner et al.

(10) Patent No.: US 7,510,333 B2
(45) Date of Patent: Mar. 31, 2009

(54) STERN DRIVE SHAFT SUPPORT BEARING

(75) Inventors: Colin R. Tanner, Flowery Branch, GA (US); Manuel Bautista, Buford, GA (US)

(73) Assignee: Aktiebolaget SKF, Gothenburg (SE)

( * ) Notice: Subject to any disclaimer, the term of this patent is extended or adjusted under 35 U.S.C. 154(b) by 505 days.

(21) Appl. No.: 11/414,338

(22) Filed: May 1, 2006

(65) Prior Publication Data
US 2007/0253656 A1 Nov. 1, 2007

(51) Int. Cl.
*F16C 33/62* (2006.01)
(52) U.S. Cl. .................. 384/492; 384/907; 384/913
(58) Field of Classification Search .............. 384/492, 384/569, 907, 912, 913, 42
See application file for complete search history.

(56) References Cited

U.S. PATENT DOCUMENTS

| | | | |
|---|---|---|---|
| 3,368,717 A | | 2/1968 | Weber, III |
| 3,528,712 A | | 9/1970 | Vacca et al. |
| 4,938,726 A | | 7/1990 | Bland et al. |
| 5,028,151 A | | 7/1991 | Nisley |
| 5,129,253 A | | 7/1992 | Austin et al. |
| 5,178,690 A | * | 1/1993 | Maiquez .................. 148/265 |
| 5,911,607 A | | 6/1999 | Lacko et al. |
| 5,989,177 A | | 11/1999 | West et al. |
| 6,062,735 A | * | 5/2000 | Ward ........................ 384/492 |
| 6,146,021 A | * | 11/2000 | Ward ........................ 384/492 |
| 6,318,898 B1 | * | 11/2001 | Ward et al. ................ 384/492 |

OTHER PUBLICATIONS

"Gimbal Bearing Removal—Method A", Mercstuff.com, see http//www.mercstuff.com/gimbalbearing1.htm, printed on Feb. 20, 2006.
"Gimbal Bearing Removal—Method B", Mercstuff.com, see http//www.merstuff.com/gimbalbearing2.htm, printed on Feb. 20, 2006.
"Gimbal Bearing Removal—Method A", Mercstuff.com, see http//www.mercstuff.com/gimbalbearing1.htm, printed on Feb. 20, 2006.
"Gimbal Bearing Removal—Method B", Mercstuff.com, see http//www.mercstuff.com/gimbalbearing2.htm, printed on Feb. 20, 2006.
"Gimbal Bearing Replacement", Mercstuff.com, see http//www.mercstuff.com/gimbalbearing.htm, printed on Feb. 20, 2006.

* cited by examiner

Primary Examiner—Thomas R Hannon
(74) Attorney, Agent, or Firm—Buchanan Ingersoll & Rooney PC (57) ABSTRACT

Arrangements may include a bearing assembly, the bearing assembly having a bearing housing ring, the housing ring having an inner bore, at least a portion of the inner bore including a dry lubricant coating; a bearing, the bearing including: an outer race, the outer race having an outer surface received within the inner bore of the housing ring, at least a portion of the outer surface including a chromate anti-corrosive coating; and an inner race, the inner race having an inner race bore, and outer surface, and two radial end surfaces each extending between the inner race bore and the outer surface, at least a portion of the inner race bore, outer surface, and radial end surfaces include the chromate coating disposed thereon. Associated methods and arrangements are also described.

22 Claims, 5 Drawing Sheets

STERN DRIVE SHAFT SUPPORT BEARING

FIELD OF THE DISCLOSURE

The present disclosure relates to arrangements that include first and second relatively movable members. For example, the present disclosure relates to a bearing assembly including surfaces which are treated to improve frictional and corrosion-resistant behaviors.

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art.

Arrangements which include first and second relatively movable members have traditionally posed a number of different engineering problems to be resolved. One such challenge involves dealing with the friction which occurs at the interface between first and second relatively movable members. Another challenge involves dealing with corrosion, which can be caused by exposure to a harsh environment and/or mechanical wear.

One such arrangement is a bearing disposed between concentric relatively movable members, such as a shaft and housing. Such bearings are utilized in a number of different types of applications and machinery. For example, a typical marine propulsion system includes such a bearing arrangement at a joint which is designed to permit pivotable movement of a drive shaft. This pivotable joint is typically referred to as a gimbal, and the bearing associated therewith is referred to as a gimbal bearing.

A number of problems and disadvantages have been associated with conventional gimbal bearing design. Typically, a rubber bellows surrounds the gimbal bearing assembly, which includes a bearing housing ring and a rolling bearing disposed concentrically therein. The bellows is intended to shield the bearing assembly from the harmful effects of exposure to the surrounding marine environment. However, these rubber bellows are prone to failure resulting in exposure of the bearing assembly to the marine environment and in corrosion of the assembly.

The housing ring of the bearing assembly is typically formed from an aluminum alloy having a high hardness. This material is selected to resist corrosion caused by exposure to a marine environment, as well as fretting corrosion caused by the load bearing contact between the inner bore of the housing ring and the outer race of the bearing. However, such housing rings are prone to bind with the outer race of the bearing ring. This binding can make removal and/or installation of the bearing within the housing ring extremely difficult.

As alluded to above, the bearing is provided concentrically within the housing ring with an interference fit resulting in a torque value at the joint of approximately 15-60 ft.-lbs. This relatively tight interference fit is provided in order to prevent looseness between the housing ring and a bearing disposed therein. However, this interference fit makes installation and removal of the bearing difficult, necessitating the use of special tools and techniques for successfully completing installation and/or removal of the gimbal bearing.

Conventional gimbal bearings often use shield plates between the inner and outer races thereof in order to prevent escape of lubricant contained within the bearing. These shield plates act as non-contacting seals. Non-contacting seals are preferred to prevent fretting on the outer surface of the inner race. Thus, a small gap remains between the end of the shield plate and the surface of the inner race of the bearing. This small gap provides an opportunity for escape of the lubricant contained within the bearing. Thus, these bearing assemblies are typically provided with a port in the outer race of the bearing which allows for the introduction of lubricant to replace any lubricant lost from within the bearing. These ports must be machined in the steel bearing rings, or otherwise provided during manufacture. Providing this feature represents an added manufacturing cost. The necessity of relubricating the bearing represents a maintenance cost, as well as an inconvenience. Moreover, the lubrication port of the bearing ring must be properly aligned with a mechanism, such as another port or groove, disposed in the surrounding housing ring in or to allow for the introduction of lubricant. This required alignment complicates the replacement/installation of the bearing within the surrounding housing ring.

Thus, a need exists for an improved arrangement which comprises relatively movable members, such as a gimbal bearing assembly including a housing ring and bearing disposed concentrically therein.

SUMMARY OF THE INVENTION

According to the present invention, there is provided and improved arrangement comprising relatively movable members.

According to one aspect, the present invention is directed to an arrangement comprising relatively movable members, such as a gimbal bearing assembly including an outer housing ring and a concentrically disposed bearing, which addresses one or more of the problems or disadvantages mentioned above.

According to another aspect, the present invention is directed to a marine propulsion arrangement comprising a gimbal bearing assembly, the gimbal bearing assembly comprising: a bearing housing ring, the housing ring comprising an inner bore, at least a portion of the inner bore comprising a dry lubricant coating; a bearing, the bearing comprising; an outer race, the outer race comprising an outer surface received within the inner bore of the bearing housing ring, at least a portion of the outer surface comprising a chromate coating; and an inner race, the inner race comprising an inner race bore, and outer surface, and two radial end surfaces each extending between the inner race bore and the outer surface, at least a portion of the inner race bore, outer surface, and radial end surfaces comprising the chromate anti-corrosive coating.

According to a further aspect, the present invention is directed to a method for facilitating the installation and removal of a bearing, and improving corrosion resistance thereof, the bearing mounted within an inner bore of a bearing housing ring, the bearing comprising an outer race, the outer race comprising an outer surface received within the inner bore of the bearing housing ring, and an inner race, the inner race comprising an inner race bore, an outer surface, and two radial end surfaces each extending between the inner race bore an the outer surface, the method comprising: coating at least a portion of the housing ring inner bore with a dry lubricant; and coating at least a portion of the inner race bore, outer surface, and radial end surfaces with a chromate coating According to yet another aspect, the present invention is directed to an arrangement comprising a first relatively movable member, and a second relatively movable member, the first relatively movable member comprising an aluminum alloy with a coating comprising molybdenum disulfide; and the second relatively movable member comprising a chromium steel with a compound coating comprising green chromate.

BRIEF DESCRIPTION OF THE DRAWING FIGURES

The following detailed description of preferred embodiments can be read in connection with the accompanying drawings in which like numerals designate like elements and in which.

DETAILED DESCRIPTION

Figure 1:
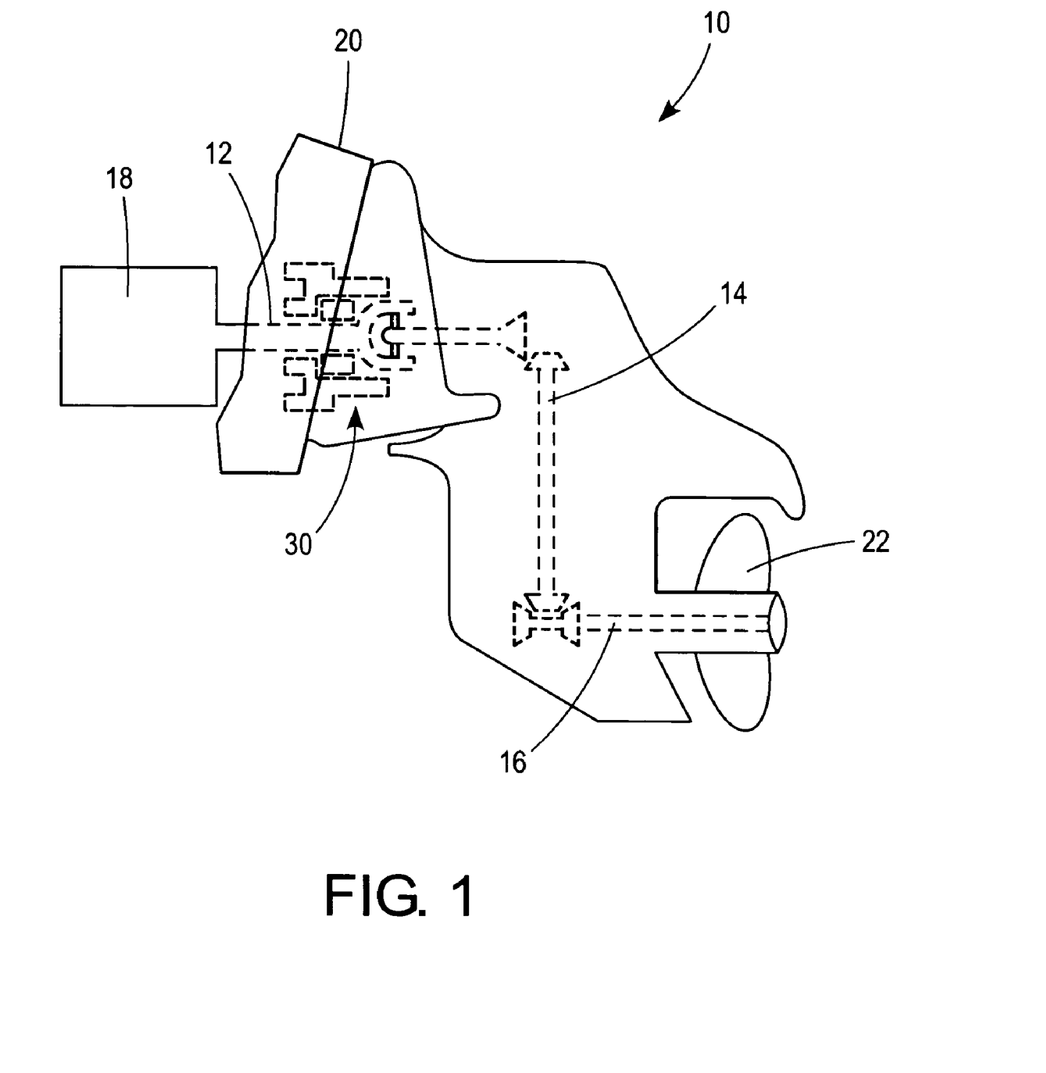
FIG. 1 is a schematic illustration of a marine propulsion system or arrangement formed according to the principles of the present invention.

FIG. 1 illustrates a marine propulsion system or arrangement 10. In particular, the illustrated arrangement is illustrative of an inboard/outboard stern drive propulsion system. The illustrated propulsion system 10 includes a plurality of drive shafts 12, 14 and 16, that couple an engine 18 located inside a vessel 20 to a propeller 22. The system or arrangement 10 further includes a gimbal bearing assembly 30.

Figure 2:
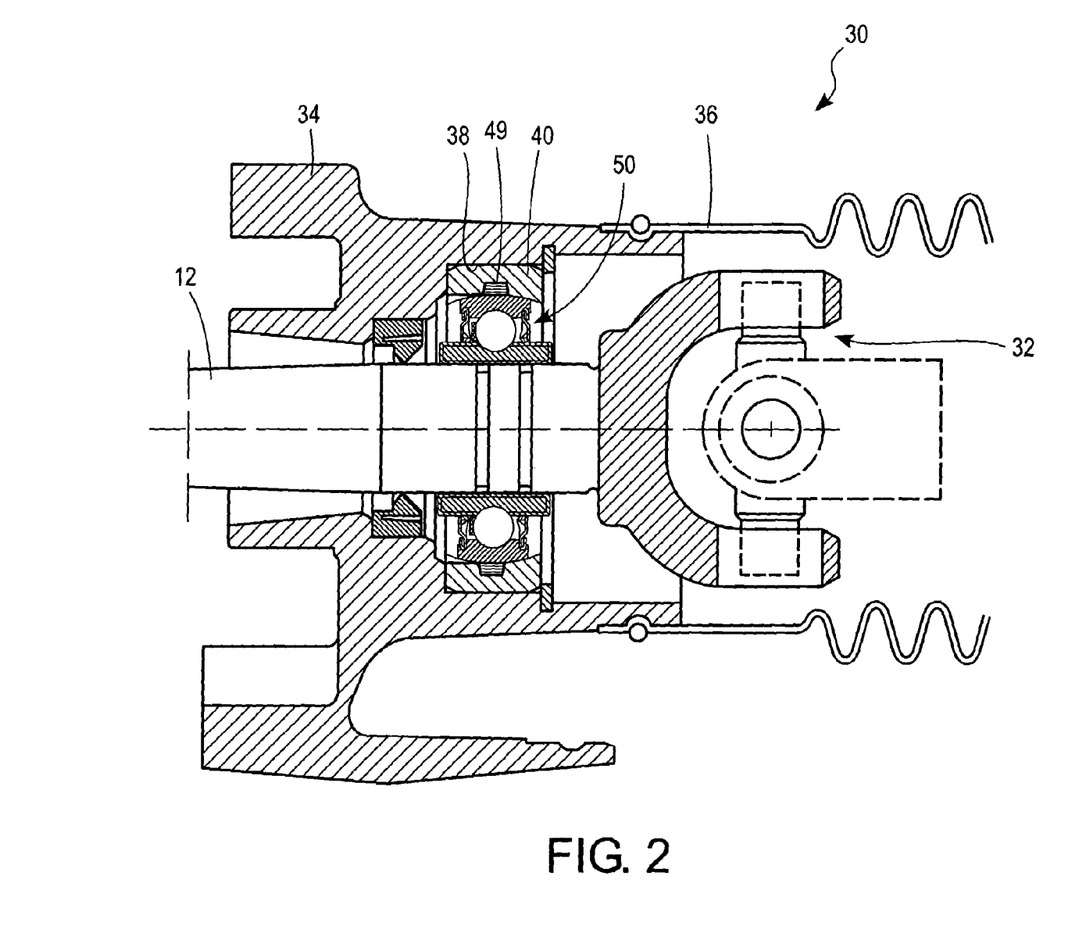
FIG. 2 is a cross-sectional view of a gimbal bearing assembly formed according to the principles of the present invention.

As best illustrated in FIG. 2, the gimbal bearing assembly 30 surrounds the drive shaft 12 having a universal joint 32 disposed at one end thereof. A transom bracket 34 surrounds the drive shaft 12 in a circumferential manner. A bellows 36 is attached to the transom bracket at a location proximate to one end thereof. The bellows 36 is intended to isolate the region lying inside the transom bracket 34 from the external marine environment. The interior of the transom bracket 34 is provided with a recess 38. A bearing housing ring 40 is disposed within the recess 38. A bearing 50 is, in turn, disposed within the bearing housing ring 40. The bearing 50 is seated upon the drive shaft 12.

Figure 3:
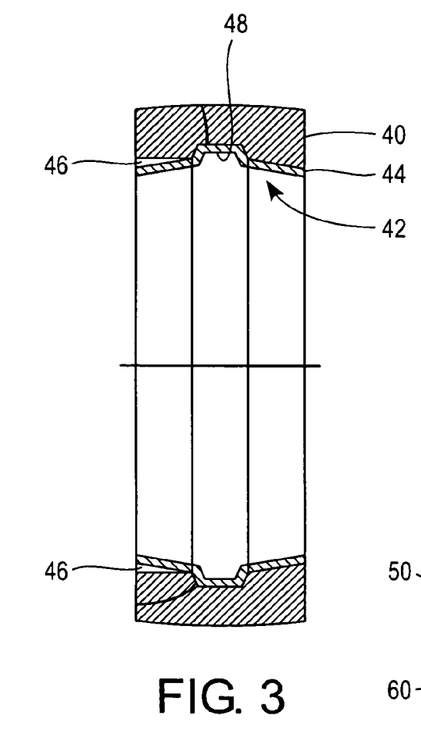
FIG. 3 is a cross-sectional view of a bearing housing ring formed according to the principles of the present invention.
Figure 5:
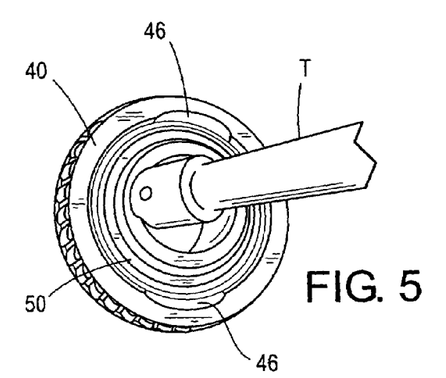
FIG. 5 is a schematic illustration of a first stage of a bearing installation/removal procedure.
Figure 6:
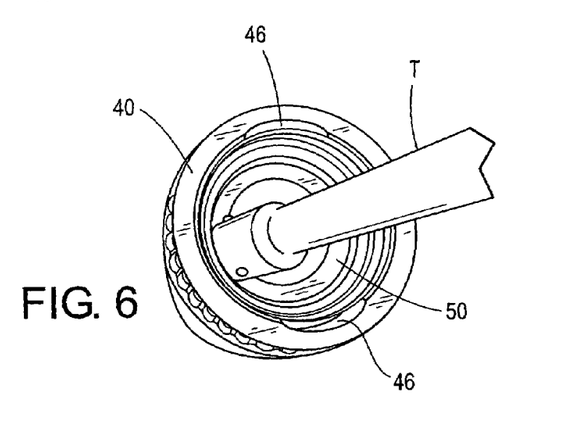
FIG. 6 is a schematic illustration of a second stage of a bearing installation/removal procedure.
Figure 7:
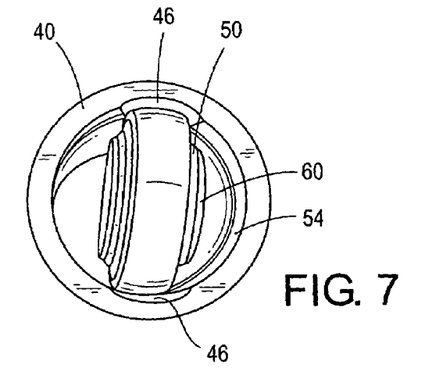
FIG. 7 is a schematic illustration of a third stage of a bearing installation/removal procedure.

Certain features which may be associated with the bearing housing ring 40 will now be described by reference primarily to FIG. 3. It should be noted that certain features of the bearing housing ring 40 are also illustrated in FIGS. 5-7. The bearing housing ring 40 can be formed from any suitable material. According to a one embodiment of the present invention, the bearing housing ring 40 is formed from a metallic material. The bearing housing ring 40 may further be formed from an aluminum alloy. While any number of suitable materials are possible, including a number of suitable aluminum alloys, according to one non-limiting example, the aluminum alloy can comprise a 6061T6 (Aluminum Association designation) series aluminum alloy.

The bearing housing ring 40 includes an inner bore 42. At least a portion of the inner bore 42 is provided with a coating 44 comprising a dry lubricant. According to the illustrated embodiment, the dry lubricant coating 44 is provided on the entire surface which constitutes the inner bore 42 of the bearing housing ring 40. However, it should be understood that it is comprehended by the present invention for the dry lubricant coating 44 to be omitted from certain regions of the inner bore 42.

The dry lubricant coating 44 can be formed from any suitable material. By way of non-limiting example, the dry lubricant coating can comprise a molybdenum disulfide ($MoS_2$) compound. It should be understood that other dry lubricants can certainly be substituted, or used in combination with, the exemplary molybdenum disulfide coating. For example, a polytetrafluoroethylene (PTFE) based coating can be used in place of, or in combination with, the above-mentioned molybdenum disulfide compound. The dry lubricant coating can be applied by any suitable technique, such techniques being generally familiar to those of ordinary skill in the art. By way of non-limiting example, the surface to be coated can be degreased, sprayed with the dry lubricant compound in a liquid medium, and subsequently cured by heating the coated surface to a temperature of approximately 400° F. for approximately 30 minutes. The dry lubricant coating 44 can be provided with any suitable thickness, which may vary depending on the application and environment within which the housing ring 40 is intended to operate. By way of non-limiting example, the dry lubricant coating is provided with a thickness on the order of about 8 to about 14 μm.

Other features which may be associated with the bearing housing ring 40 include one or more axially-extending installation/removal grooves 46, the purpose of which will be explained further in connection with the description of FIGS. 5-7. According to the principles of the present invention at least a portion of the surfaces which make up the axially extending installation/removal grooves may optionally be provided with the dry lubricant coating 44. According to certain embodiments, all surfaces which compose the axially extending installation/removal grooves are provided with the dry lubricant coating 44. The technique and thickness associated with application of the dry lubricant coating to the axially extending installation/removal grooves is the same as that discussed above in connection with the deposition of the coating on the inner bore 42 of the bearing housing ring 40. The dry lubricant coating 44 may optionally be applied to the surface(s) of the axially extending installation/removal grooves 46 as part of the same procedure for applying the dry lubricant coating 44 to the inner bore 42 of the bearing housing ring 40. Finally, the bearing housing ring 40 may be provided with a reservoir 48 which is intended to contain an anti-fretting compound 49 (FIG. 2). Any suitable anti-fretting compound 49 can be utilized. According to one non-limiting example, the anti-fretting compound comprises a National Lubricating Grease Institute grade 3 grease.

One additional feature of the bearing housing ring 40 is that it is not necessary to provide a passageway therein for the introduction of additional anti-fretting compound 49 to the reservoir 48, or to carry additional lubricant to the interior of the bearing mounted therein.

Certain features which may be associated with the bearing 50 of the present invention will now all be described by reference to FIG. 4. The bearing 50 includes an outer race 52, the outer race 52 including an outer surface 54 which is received within the inner bore 42 of the bearing housing ring 40. The bearing 50 further includes an inner race 56 which is composed of an inner race bore 58, an outer surface 60, and two opposing radial end surfaces 62 interconnecting the inner race bore 58 with the outer surface 60. A plurality of rolling elements 64 are provided in the circumferential gap between outer race 52 and the inner race 56. A plurality of radial lip seals 66 are disposed at either end of the outer race 52, and make sealing contact with the outer surface 60 of the inner race 56. The radial lips seals 66 act to confine lubricant contained between the outer race 52 and inner race 56 to the area within which the rolling elements 64 located.

Figure 4:
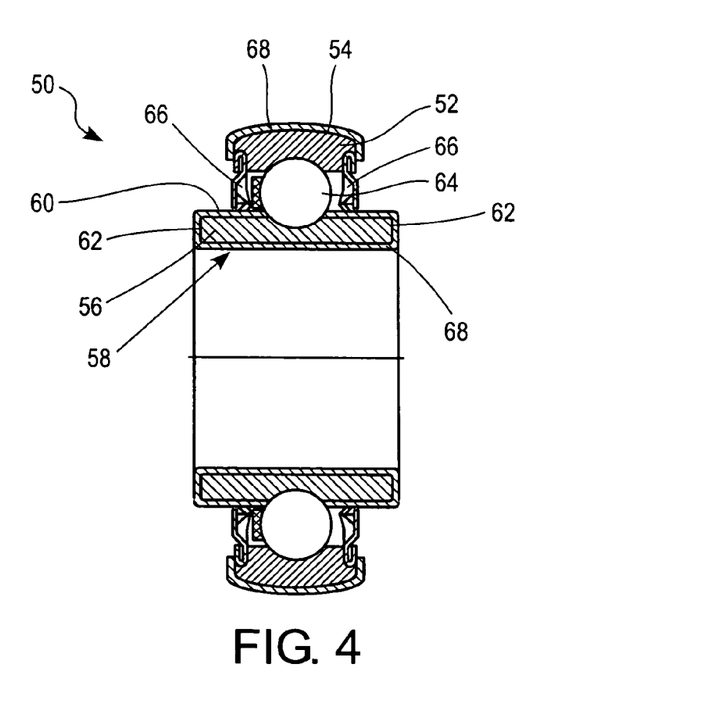
FIG. 4 is a cross-sectional view of a bearing formed according to the principles of the present invention.

As illustrated in FIG. 4, one or more surfaces of the inner and/or outer races 52, 56 are provided with a coating 68 comprising a chromate. The coating 68 acts to improve corrosion resistance and/or resistance to fretting. The chromate coating 68 can comprise any suitable chromate. By way of non-limiting example, the coating 68 comprises a green chromate. In the chromate conversion process, a metal surface of a part is converted to a superficial layer containing a complex mixture of chromium compounds. Chromate conversion coatings provide excellent corrosion resistance, and also provide additional resistance to fretting wear and corrosion. Chromate conversion coatings vary in color depending on the chemical being used and the base metal being coated. Colors range from clear, to light iridescent, to gold. Generally, greater corrosion protection is provided with formulations that give a golden color, as these coatings tend to be thicker. A coating comprising any of these chromate conversion coatings, regardless of color, are comprehended by the present invention. The coating 68 can be applied by any suitable technique. Suitable techniques include powder coating methods, and liquid-based methods, including dipping and/or spraying. Such techniques being generally known to those of ordinary skill in the art. The specifics of the chromate conversion process being well within the capabilities of those of ordinary skill in the art.

According to one illustrative and non-limiting example, the chromate coating can be applied by a sequence of steps including washing the base part to cleanse the surface, rinsing the cleaned apart, activating the surface to be coated, plating the surface to be coated, and converting the plating.

The wash can be prepared from a mixture of commercially available chemicals. By way of example, (a) Dipsol 144 SC (manufactured by Dipsol of America) or (b) Colec AP (manufactured by McDermid) can be mixed with Emprep 359 S (Enthone Omi), Electrotec (Tecnoproteccion), and Ronaclean (Galvanolite)

After the surface of the base part has been treated with the above wash, it is rinsed with water.

The surface to be coated is then activated by exposure to a mixture of Citric Acid (Hervi), Actane 345 (Enthone Omi), and optionally Hydrochloric acid (Galvanoquimica).

Plating is then carried out by application of a mixture of Potassium Chloride (Galvanoquimica/Galvanolite), Boric Acid (Galvanoquimica/Galvanolite) and Zinc Cloride (Galvanoquimica/Galvanolite).

The plating is then activated. If yellow chromate is desired, the plating is exposed to a mixture of Dispsol 549 (Dipsol), Imunox 3 K (Enthone omi), and Macrtobrite L (Mc Dermid). If green chromate is desired, a mixture of ZG555Y (Dipsol), Imunox 3 K (Enthone omi), and Macrtobrite L7 (McDermid) is used.

The coating 68 can be provided with any suitable thickness. By way of non-limiting example, the coating can be provided with a thickness of about 4 to about 8 µm.

As noted above, the chromate coating 68 into provided on one or more surfaces of the inner and outer races 52, 56. According to the illustrated embodiment, the chromate coating 68 is provided on at least the outer surface 54 of the outer race 52, the inner race bore 58, the outer surface of the inner race 60, and the two opposing radial and surfaces 62. It is comprehended by the present invention at the chromate coating 68 may be omitted on one or more of the above-listed surfaces. It is also with in the scope of the present invention that the coating be applied to additional areas of the bearing 50, as well as the bearing housing ring 40.

An arrangement which includes at least one or combination of some or all of the above-mentioned characteristics provides certain advantages and benefits over conventional arrangements. For instance, in the event that the assembly is exposed to harsh marine environmental conditions, resistance to corrosion is greatly improved, at least partly due to the presence of the coating 68. The tendency for binding due to the use of a high-hardness aluminum alloy material for construction of the housing ring 40 can be for the most part avoided, due at least in part to the presence of the dry lubricant coating 44. Since movement between the bearing housing ring 40 and the bearing 30 is facilitated, installation and removal of the bearing is much easier despite the fact that the two components are mounted together with a rather tight interference fit. Due to improved fretting corrosion resistance, the bearing 50 of the present invention may utilize contact lips seals 66 instead of non-contacting shield plates. As a result, the interior of the bearing, which contains lubricant, is more tightly sealed. Therefore, the need for frequent relubrication is avoided. As a result, there is no need to provide either the bearing housing ring 40 or the outer race 52 with lubrication ports or passages. This represents a savings in terms of manufacture as well as maintenance.

As alluded to above, one area in which the advantages imparted by the principles of the present invention pay dividends is in the installation and removal of gimbal bearing assemblies. In conventional gimbal bearing arrangements, the removal and replacement of these bearings often proves extremely difficult due to the presence of corrosion and the tight interference fit between the bearing housing ring and the bearing disposed therein. According to the present invention, these difficulties can be overcome by structures and methods associated with the above-described principles. Thus, according to the present invention, a method which involves coating at least a portion of the bearing of housing ring inner bore 42 with the dry lubricant coating 44, and coating at least a portion of the inner race bore 58, outer surface 60, and radial end surfaces 62 with a coating 68 comprising a chromate serves to facilitate the installation and removal of a bearing, and improve the corrosion resistance thereof. As noted above, the entire inner bore 42 of the bearing housing ring 40 can be coated with a dry lubricant, and the entire inner race bore 58, the entire outer surface 60 of the inner bearing race, and the entire extent of the opposed radial end surfaces 62 can be provided with the coating 68. The dry lubricant coating 44 can be provided with any suitable thickness, such as about 8 to about 14 µm, and of the coating 68 can be provided with any suitable thickness, such as about 4 to about 8 µm. The composition of the dry lubricant coating 44 and the chromate coating 68, as well as the techniques for the application thereof, are the same as that previously described above.

FIGS. 5-7 illustrate a bearing removal procedure which is greatly facilitated by the present invention. As illustrated therein, a bearing housing ring 40 is provided which includes the dry lubricant coating, as described herein. The bearing housing ring 40 includes, according to the illustrated embodiment, a plurality of axially extending installation/removal grooves 46, which are also provided with the dry lubricant coating in the manner described herein. A bearing 50 is disposed, with a tight interference fit, within the bearing housing ring 40. The tool T is used to push the bearing 50 to begin the removal process. As illustrated in FIG. 6, as pressure is applied to the bearing 50 by the tool T in the manner illustrated, the bearing is rotated, or twisted within the bearing housing ring 40. This twisting or rotation is continued until the bearing 50 is reoriented at a position which is approximately 90° relative to its original mounted position within the bearing housing ring 40, as illustrated in FIG. 7. Once the bearing 50 is disposed in the position illustrated in FIG. 7, the bearing can then be axially withdrawn from the bearing housing ring 40 via the axially extending installation/removal grooves 46. This can be accomplished by manually grasping and withdrawing the bearing 50 therefrom.

Figure 8:
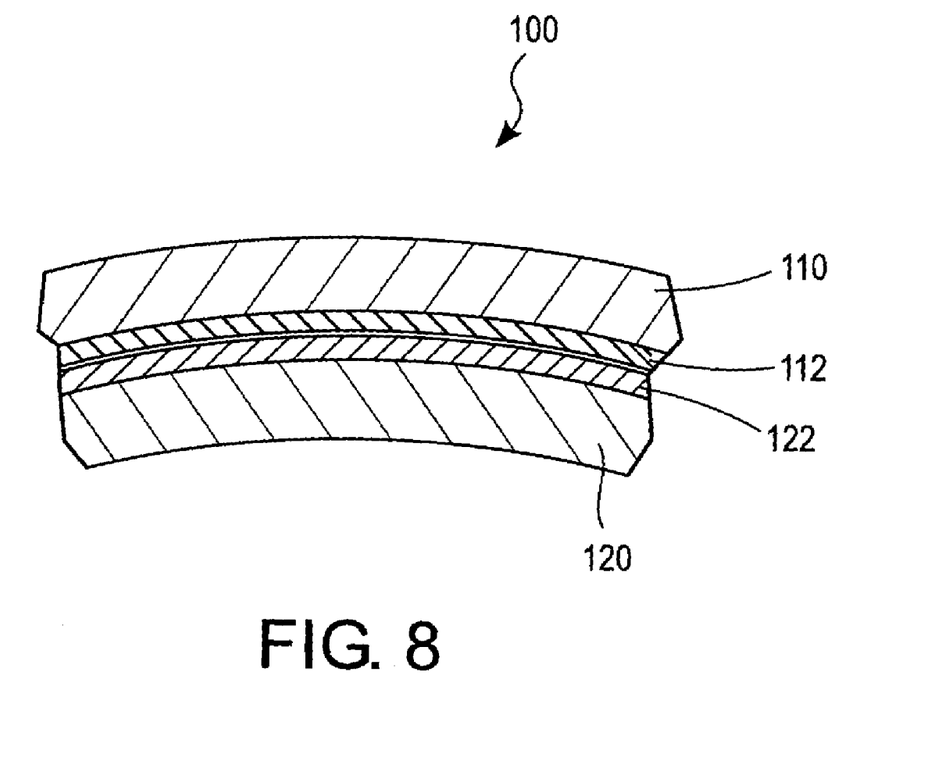
FIG. 8 is a schematic illustration of an arrangement of relatively movable members formed according to the principles of the present invention.

While much of the above description has centered around application of the principles of the present invention within the context of bearings, and more specifically, within the context of gimbal bearings utilized in marine applications, it should be understood that the application of the principles of the present invention are not limited thereto. It should be evident to one of ordinary skill in the art that the principles of the present invention may be useful in a number of different applications and environments. Thus, the arrangement 100 illustrated in FIG. 8 is representative of the broader aspects of the present invention. The arrangement 100 includes a first relatively movable member 110 which is provided with a first coating 112. The arrangement 100 further includes a second relatively movable member 120, which is provided with a second coating 122. The first relatively movable member can be constructed of any suitable material. According to non-limiting examples, the first relatively movable member can be constructed of an aluminum alloy material, such as a series 6061T6 aluminum alloy. The first coating 112 can be formed from any suitable material. For example, the coating 112 can comprise a dry lubricant. According to non-limiting examples, the dry lubricant can comprise a molybdenum disulfide compound. The first coating 112 can be provided with any suitable thickness. For example, the first coating can be provided with a thickness on the order of about 8 to about 14 μm. Similarly, the second relatively movable member can be constructed from any suitable material. According to one and non-limiting example, the second relatively movable member can be constructed of a chromium steel alloy, such as series 52100 fully hardened chromium steel alloy. Second coating can likewise be formed from any suitable material. For example, the second coating comprises a chromate coating. A number of different chromate coatings are envisioned. For example, the second coating 122 can comprise a green chromate coating. A second coating 122 can also be provided with any suitable thickness. For example, the second coating 122 can be provided with a thickness on the order of about 4 to about 8 μm. These coatings can be applied by any suitable technique. For example, the techniques previously described herein can be utilized to dispose these coatings 112, 122 on the first and second relatively movable members 110, 120, respectively. The arrangement 100 possesses many of the same advantages previously described herein. Namely, the arrangement 100 possesses excellent resistance to corrosion, fretting corrosion, binding, etc.

All numbers expressing quantities of ingredients, constituents, reaction conditions, and so forth used in this specification are to be understood as being modified in all instances by the term "about". Notwithstanding that the numerical ranges and parameters setting forth, the broad scope of the subject matter presented herein are approximations, the numerical values set forth are indicated as precisely as possible. Any numerical value, however, inherently contains certain errors necessarily resulting from the standard deviation found in their respective measurement techniques.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

We claim:

1. A marine propulsion arrangement comprising a gimbal bearing assembly, the gimbal bearing assembly comprising:
   a bearing housing ring, the housing ring comprising an inner bore, at least a portion of the inner bore comprising a coating, the coating comprising a dry lubricant;
   a bearing, the bearing comprising;
      an outer race, the outer race comprising an outer surface received within the inner bore of the bearing housing ring, at least a portion of the outer surface comprising a coating, the coating comprising a chromate; and
      an inner race, the inner race comprising an inner race bore, and outer surface, and two radial end surfaces each extending between the inner race bore and the outer surface, at least a portion of the inner race bore, outer surface, and radial end surfaces have disclosed thereon the coating comprising a chromate.

2. The arrangement of claim 1, wherein the entire bearing housing ring inner bore surface is coated with the coating comprising a dry lubricant, the entire outer surface of the outer race, the entire inner race bore, outer surface of the inner race, and the radial end surfaces are coated with the coating comprising a chromate.

3. The arrangement of claim 1, wherein the bearing housing ring further comprises a plurality of axially-extending installation/removal grooves, at least a portion of the installation/removal grooves having disposed thereon the coating comprising a dry lubricant.

4. The arrangement of claim 3, wherein the installation/removal grooves are completely coated with a coating comprising a dry lubricant.

5. The arrangement of claim 1, wherein the dry lubricant comprises a molybdenum disulfide compound, and the chromate comprises a green chromate.

6. The arrangement of claim 5, wherein the coating comprising a dry lubricant coating has a thickness of about 8 to about 14 μm, and the coating comprising a chromate has a thickness of about 4 to about 8 μm.

7. The arrangement of claim 1, wherein the bearing housing ring comprises an anti-fretting compound reservoir disposed in the bearing housing ring inner bore.

8. The arrangement of claim 7, further comprising grease disposed in the reservoir.

9. The arrangement of claim 1, wherein the bearing housing ring lacks a lubricant passageway.

10. The arrangement of claim 1, wherein the housing ring comprises an aluminum alloy, and the outer race comprises a chromium steel.

11. The arrangement of claim 10, wherein the aluminum alloy comprises 6061T6 alloy, and the chromium steel comprises fully hardened 52100 alloy.

12. The arrangement of claim 1, further comprising a flexible bellows circumferentially surrounding the bearing housing ring.

13. A method for facilitating the installation and removal of a bearing, and improving corrosion resistance thereof, the bearing mounted within an inner bore of a bearing housing ring, the bearing comprising an outer race, the outer race comprising an outer surface received within the inner bore of the housing ring, and an inner race, the inner race comprising an inner race bore, an outer surface, and two radial end surfaces each extending between the inner race bore and the outer surface, the method comprising:

coating at least a portion of the bearing housing ring inner bore with a coating comprising dry lubricant; and coating at least a portion of the inner race bore, outer surface, and radial end surfaces with a coating comprising a chromate.

14. The method of claim 13, further comprising coating the entire inner bore of the bearing housing ring with a dry lubricant, and coating the entire inner race bore outer surface, and radial end surfaces with the anti-corrosive coating comprising a chromate.

15. The method of claim 13, wherein the bearing housing ring comprises a plurality of axially-extending installation/removal grooves, the method further comprising: coating the installation/removal grooves with the coating comprising a dry lubricant.

16. The method of claim 15, wherein the bearing housing ring comprises an aluminum alloy, and the outer race comprises a chromium steel, and wherein the dry lubricant comprises a molybdenum disulfide compound, and the chromate comprises a green chromate.

17. The method of claim 15, wherein the bearing housing ring comprises an anti-fretting compound reservoir disposed in the bearing housing ring inner bore, the method further comprising disposing grease in the reservoir prior locating the bearing within the bearing housing ring.

18. The method of claim 17, wherein after the bearing is introduced into the bearing housing ring, no additional lubricant is introduced into the reservoir during a service life period of the bearing.

19. The method of claim 13, wherein the coating comprising a dry lubricant is provided with a thickness of about 8 to about 14 μm, and the coating comprising a chromate is provided with a thickness of about 4 to about 8 μm.

20. An arrangement comprising a first relatively movable member, and a second relatively movable member, the first relatively movable member comprising an aluminum alloy with a coating comprising a molybdenum disulfide compound; and the second relatively movable member comprising a chromium steel with a coating comprising a green chromate compound.

21. The arrangement of claim 20, wherein the coating comprising a dry lubricant has a thickness of about 8 to about 14 μm, and the coating comprising a green chromate compound has a thickness of about 4 to about 8 μm.

22. The arrangement of claim 21, wherein the aluminum alloy comprises 6061T6 alloy, and the chromium steel comprises fully hardened 52100 alloy.

\* \* \* \* \*